United States Patent Office 2,918,134
Patented Dec. 22, 1959

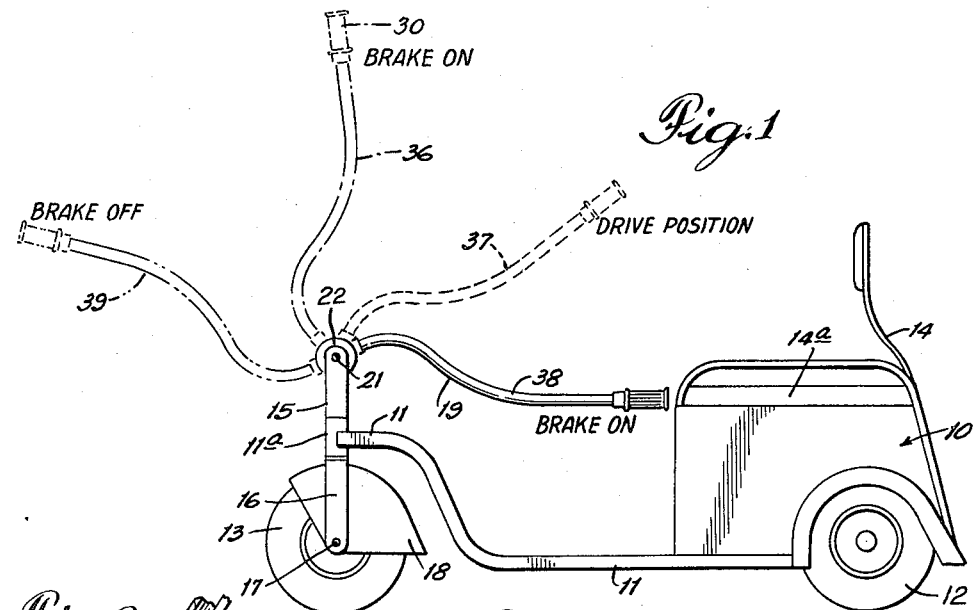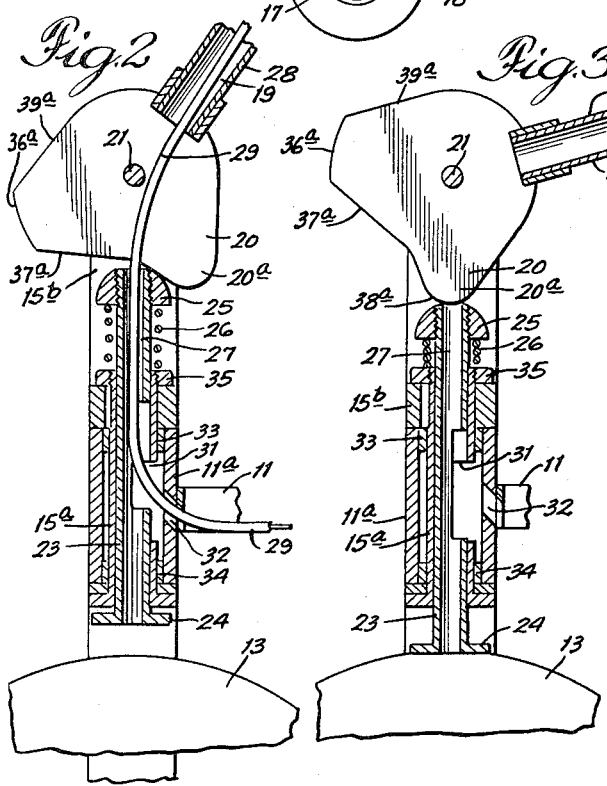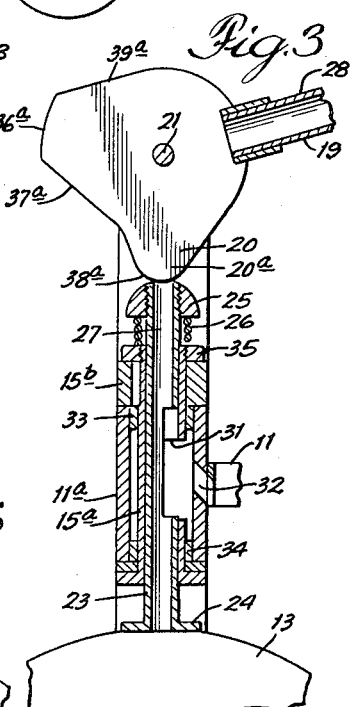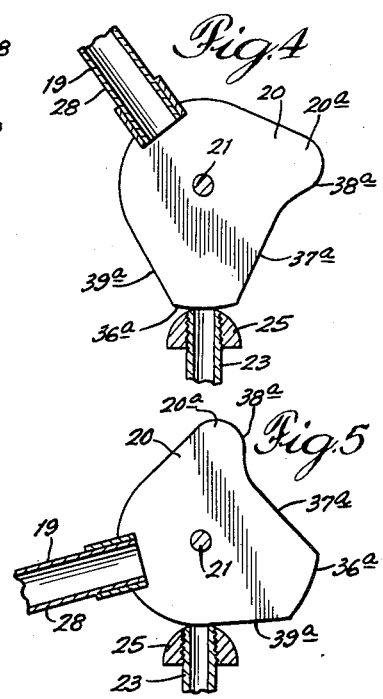

2,918,134

COMBINED CONTROL MEANS FOR GOLFMOBILE

William A. Jensen, Addison, Ill.

Application April 22, 1957, Serial No. 654,162

3 Claims. (Cl. 180—27)

This invention relates to a golfmobile, and more particularly to a motorized vehicle for transporting golfers and their golfing equipment around golf courses.

With the advent of intensified interest in the sport of golfing, many vehicles, motorized or otherwise, have been provided for transporting golfers and their equipment around golf courses. Vehicles of this nature preserve and promote the enjoyment of the sport while at the same time act to relieve the golfer of the monotonous and sometimes dangerous part of the game. This is particularly true of golfers who are in weakened physical conditions, such as those who have weak hearts. Thus, motorized carts have been provided for transporting the heavy golf bags while other vehicles have been provided for transporting the golfers themselves. However, all of these vehicles are distinctly limited to the function for which they are designed. If a golfer employing a cart used to act as a caddy desires to ride, such is impossible. Likewise, a golfer using a cart adapted to carry people, is unable to walk, if he so desires. It is to be noted that walking around a golf course, where permitted by the golfer's physical condition, is considered by many to be one of the more desirable features of the game. Thus, it would be distinctly desirable to employ a vehicle which permitted a golfer to walk or ride as he chose, and being so constructed as to permit this decision to be made and put into effect in a moment's notice.

It is therefore a general object of this invention to provide a motorized golfing vehicle that is capable of being operated from either a walking or a riding position. Another object is to provide in a golfing vehicle of this character a novel type of steering mechanism that permits vehicle operation from both walking and riding positions. Still another object is to provide a motorized golfing vehicle that can be braked from a plurality of arcuate positions of a pivotally mounted steering handle. Yet another object is to provide a motorized golfing vehicle of the character delineated in the object set forth immediately above wherein cam means are employed to actuate braking means. A further object is to provide a golfing vehicle that is operative from both walking and riding positions, and which is equipped with a pivoted steering handle wherein means for regulating the speed of propulsion are provided in the handle. Other objects and advantages of this invention can be seen as this specification proceeds.

This invention will be explained, in an illustrated embodiment, in conjunction with the accompanying drawings, in which Fig. 1 is an elevational drawing of a motorized golfing vehicle adapted to be operated from both walking and riding positions; Figs. 2 and 3 are fragmentary cross-sectional views of the steering mechanism provided in the vehicle shown in Fig. 1, Figs. 2 and 3 showing different operative positions of the various working elements of the mechanism; Figs. 4 and 5 are fragmentary cross-sectional views of the apparatus shown in Figs. 2 and 3, but in still other operative positions.

In the illustration given, the numeral 10 denotes generally a motorized golfing vehicle. Vehicle 10 includes a frame 11 so constructed and arranged as to carry at least the weight of a golfer and his golfing equipment. Rotatably associated with frame 11 are rear wheels 12 (only one of which is shown in Fig. 1) and front wheel 13. It is believed unnecessary to show the association of rear wheels 12 and front wheel 13 with frame 11 in greater detail, since those skilled in the art upon consulting my invention will perceive alternate ways of achieving this association. Mounted on the rear portion of frame 11 is seat 14 which, in the base thereof designated 14a, carries and covers the necessary source of power for propelling vehicle 10. Conveniently, the power source can take the form of a number of storage batteries (not shown) which operate through a direct current motor for driving vehicle 10. Again, those skilled in the art will readily perceive various ways of achieving this relationship so it is considered unnecessary to describe this in greater detail.

The forward portion of frame 11 of vehicle 10 is connected to a vertically disposed housing 15. Housing 15 is pivotally mounted within a sleeve 11a which is secured to the forward part of frame 11. Housing 15 at its lower portion is equipped with a fork or yoke 16 that carries the axle 17 of front wheel 13. Thus, sleeve 11a acts as a journal for housing 15 in permitting housing 15 to be rotated and thus change the direction of front wheel 13. Fork 16 also carries fender 18.

The upper end of housing 15 carries a pivotally mounted handle 19 which is shown in four positions in Fig. 1. Suitable notations associated with each of the positions shown in Fig. 1 indicate the way the particular position shown effects the operation of vehicle 10. These positions, along with the configuration of handle 19, will be described in greater detail after a description is given of the steering and braking mechanism associated with housing 15.

Referring now to Figs. 2 and 3, the fragmentary end of handle 19 is seen in the upper right-hand corner of each figure. Handle 19 is secured to cam 20, cam 20 being pivotally mounted at the upper end of housing 15. The pivotal mounting of cam 20 can be achieved by pin 21 which can be suitably journalled in housing 15. An additional circular housing 22 (seen only in Fig. 1) can be provided about cam 20 so as to prevent inadvertent distortion of the cam surfaces of cam 20.

In Figs. 2 and 3, a brake structure is shown slidably mounted within housing 15. The brake mechanism referred to is seen to include a brake rod 23 which is slidably mounted within a constricted portion 15a of housing 15. Constricted portion 15a of housing 15 is the portion rotatably associated with sleeve journal 11a of frame 11. The lower end of brake rod 23 carries an enlarged portion or shoe 24 which, when depressed (as seen in Fig. 3), bears against the top surface of front wheel 13 so as to brake the same.

The upper end of brake rod 23 carries a cam follower 25 which is continuously urged into engagement with the cam surfaces of cam 20 by helical spring 26. Helical spring 26 is shown in a condition of compression in Fig. 3 when brake shoe 24 is in engagement with front wheel 13.

Brake rod 23 is hollow throughout its length, thereby providing passage 27. Handle 19 likewise is provided with a longitudinal passage 28. Extending through handle passage 28 and brake rod passage 27 is flexible cable 29 which, at one end, is attached to rotatably mounted hand grip 30 of handle 19, and at the other end to a motor on-off switch (not shown). An opening 31 is provided in the side wall of brake rod 23 to permit flexible cable 29 to pass therethrough and along frame 11 to the location of a motor switch. Sleeve 11a is also provided with an opening for this portion, the opening being denoted in Figs. 2 and 3 as 32.

Housing 15 is journalled within sleeve 11a at 15a by means of bearings 33 and 34 at the upper and lower ends thereof, respectively. In the illustration given, housing 15 is provided in two parts. The lower portion which includes constricted portion 15a carrying brake rod 23 and which is provided at its lower end with a fork 16, is connected with another portion, upward thereof, which carries a cam fork and which is designated 15b in Figs. 2 and 3. The two parts are locked together by fork nut 35 which is threadedly mounted on the lower portion of 15a and which locks against upper portion 15b of housing 15.

My invention will be further explained and appreciated by a consideration of the following, wherein a typical operating procedure is set down.

*Operation*

When a person (not shown) employs vehicle 10 as a means of transportation around a golf course, he has a choice of either riding vehicle 10 or walking in front of the same. When in a riding position, the golfer can be comfortably seated on seat 14 which also can accommodate his golfing equipment. When he first enters vehicle 10, handle 19 will be in an upwardly extending direction, as indicated by the numeral 36 in Fig. 1. Cam 20 is therefore oriented as shown in Fig. 4, and brake rod 23 is in a depressed condition so as to have brake shoe 24 applied to front wheel 13 and thereby immobilize the vehicle. When the driver of vehicle 10 is seated and desirous of accelerating the vehicle, all that is necessary is movement of handle 19 to a rearward position such as is designated 37 in Fig. 1, and which corresponds to the configuration of elements in Fig. 2. It is here to be noted that a different face of cam 20 is now presented to cam follower 25 so that cam follower 25 rises under the urging of spring 26 and retracts brake shoe 24. Whenever the rider desires to stop, as when he approaches the lie of his ball, all that is necessary is for him to return handle 19 to a vertically upward position, as indicated by the numeral 36.

Acceleration of the vehicle is achieved by rotating handle grip 30 which in turn operates flexible cable 29 connected to a motor switch, or in the event an engine is employed, to a throttle. There is sufficient resiliency in flexible cable 29 to return handle grip 30 to a switch-off position whenever handle grip 30 is released, as when handle 19 is returned to a vertical position such as indicated by the numeral 36.

In the event quick braking is desired from a riding position, as where a steep hill is descended (not unusual on golf courses), it is only necessary for the driver to push down on handle 19 as indicated by the numeral 38 in Fig. 1. The configuration of brake elements corresponding to this position of handle 19 is shown in Fig. 3 wherein brake shoe 24 once again engages front wheel 13. It is to be noted that under these circumstances, because of the configuration of cam 20, the greater the pressure applied to handle 19, the greater the braking action. Aiding in this operation is arcuate portion 20a of cam 20. Because of the configuration of cam follower 25 and cam 20, it is impossible to depress handle 19 to the extent that cam follower 25 could rise and therefore destroy the desired braking action.

Should the golfer after having ridden vehicle 10 for a while desire to walk, all that is necessary is for him to position himself in front of the vehicle and pull handle 19 downwardly and forwardly, as indicated by the numeral 39 in Fig. 1. At this juncture another face of cam 20 (as seen in Fig. 5) engages cam follower 25 and permits cam follower 25 to rise, thus releasing brake shoe 24 from its engagement with front wheel 13. Thereafter, a twist of handle grip 30 starts the propulsion of vehicle 10.

In the event that it is desired to have different vehicle speeds for walking and riding, the same can be achieved through the use of a two-speed switch which is electrically connected with the motor-propelling vehicle 10. Such a switch can be conveniently positioned on frame 11 within reach of a rider on seat 14. However, I prefer to mount such a switch on housing 15 so that it can be engaged by a portion of cam 20. Thus, when cam 20 is oriented for driving operation, the switch which may be conveniently of a toggle type, will be in the higher speed position.

It is to be noted that cam 20 is provided with four cam-operating faces designated 36a, 37a, 38a and 39a, as all shown on Fig. 4. Face 36a corresponds to the face engaging cam follower 25 when handle 19 is disposed vertically upward and brake shoe 24 is engaged with front wheel 13. This is shown in Fig. 4. Cam face 37a is the cam follower engaging face shown in Fig. 2 which corresponds to position 37 of Fig. 1, wherein the handle 19 is in a drive position. Cam face 38a is the cam follower engaging face of cam 20 when handle 19 is in the brake-on position designated 38 in Fig. 1. The numeral 39a is the designation given to a face of cam 20 when that face is in engagement with cam follower 25 when handle 19 is disposed forwardly for a walking operation, such as is indicated by the numeral 39 in Fig. 1. In each of these cases, it is to be noted that each cam face, i.e., numerals 36a–39a inclusive, is characterized by a rather long cam surface so that it is not necessary to hold handle 19 in a particular arcuate position, but rather that certain desirable leeway is permitted in the positioning of handle 19. It is also to be noted that the intersection of cam surfaces 39a with 36a, and 36a with 37a, are somewhat abrupt so that when normal braking is desired, movement of handle 19 into about the proper position will result in proper camming action.

Very satisfactory results in operation have been achieved when handle 19 is provided in the arcuate form shown in Fig. 1 and characterized by a curvilinear portion adjacent the point of pivoting on housing 15. This permits comfortable positioning of handle 19 during all conditions of operation. If handle 19 were straight, the handle would either be uncomfortable during walking or riding, or the cam surfaces associated with such conditions would have to be made shorter and the vehicle steering and braking mechanism thereby being more sensitive to handle position.

While in the foregoing description, a detailed discussion has been given of an embodiment of my invention, such discussion has been given for purposes of clearness of understanding only, and it is to be appreciated that those skilled in the art will readily perceive variations and refinements within the scope of my invention.

I claim:

1. In a motorized golf vehicle, a body equipped with a seat, a pair of powered rear wheels rotatably mounted on said body, a hollow post vertically and pivotally mounted on the front portion of said body spaced from said seat, said post being equipped with a fork at the lower end thereof and rotatably carrying a front wheel in said fork, brake means in said post for stopping said front wheel, a cam pivotally mounted on the top of said post for engaging said brake means, a steering handle secured to said cam and movable over a vertical arc of about 180° so as to permit steering of said vehicle through said handle by a golfer either riding on said seat or walking in front of said vehicle, said cam being equipped with a brake means-actuating portion in the contour thereof effective to apply said brake means to said front wheel when said steering handle is positioned midway between the riding and walking positions of said steering handle, said cam being equipped with a second brake means-actuating portion in the contour thereof and spaced from the first-mentioned portion, said second actuating portion being effective to brake said front wheel when said steering handle is depressed from its position during rider steering.

2. In a motorized vehicle for transporting golfers, a frame, front and rear wheel means rotatably mounted on said frame with said front wheel means also being pivotally mounted on said frame, a cam follower-equipped brake on said frame for the front wheel means, seat means on said frame positioned over said rear wheel means, handle means pivotally mounted on said frame for arcuate movement in both a vertical plane and a horizontal plane and carrying means for regulating the speed of said vehicle, said handle means also being coupled to said front wheel means to turn the same by movement of said handle means in a horizontal plane, said handle means being adapted to be swung over a vertical arc of about 180° so that said vehicle can be steered and the propulsion thereof regulated through said handle means by a golfer either seated on said seat means or walking in front of said vehicle, said handle means being equipped with a cam for applying said brake by movement of the cam follower thereof both when said handle means is extending approximately vertically upwardly and also when said handle means is depressed from a position extending approximately rearwardly of said vehicle.

3. The structure of claim 2 in which the portion of said handle means adjacent the pivotal mounting thereof is arcuate, whereby said handle means is directed angularly upwardly when positioned for operation by a golfer walking in front of said vehicle.

References Cited in the file of this patent

UNITED STATES PATENTS

| | | |
|---|---|---|
| 1,766,104 | Coates | June 24, 1930 |
| 2,399,605 | Schroeder | Apr. 30, 1946 |
| 2,443,480 | Schwitzer et al. | June 15, 1948 |
| 2,468,801 | Beall | May 3, 1949 |
| 2,645,297 | Wennberg et al. | July 14, 1953 |
| 2,792,718 | Ellison | May 21, 1957 |
| 2,828,827 | Chouinard | Apr. 1, 1958 |